(12) United States Patent
Anderson et al.

(10) Patent No.: US 6,543,232 B1
(45) Date of Patent: Apr. 8, 2003

(54) VALVE ASSEMBLY FOR USE IN A GAS FUEL NOZZLE

(75) Inventors: Torger J. Anderson, Manchester, CT (US); William Proscia, Marlborough, CT (US); Jayant S. Sabnis, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 47 days.

(21) Appl. No.: 09/965,217

(22) Filed: Sep. 27, 2001

(51) Int. Cl.$^7$ ................................................. F02C 7/22
(52) U.S. Cl. ....................... 60/741; 60/744; 137/625.11; 251/59
(58) Field of Search ........................... 60/731, 741, 744; 431/90, 281; 137/625.11, 624.13; 251/59

(56) References Cited

U.S. PATENT DOCUMENTS

| | | | | |
|---|---|---|---|---|
| 2,938,345 A | * | 5/1960 | Perle ........................... 60/744 |
| 3,229,465 A | * | 1/1966 | Hill ............................. 60/744 |
| 3,356,106 A | * | 12/1967 | Riseman et al. ....... 137/624.12 |
| 4,757,684 A | * | 7/1988 | Wright .......................... 251/59 |
| 5,548,959 A | * | 8/1996 | Lechevalier ................. 60/734 |
| 6,381,947 B2 | * | 5/2002 | Emmons .................. 60/39.281 |

* cited by examiner

*Primary Examiner*—Ted Kim
(74) *Attorney, Agent, or Firm*—Carlson, Gaskey & Olds

(57) ABSTRACT

A valve assembly that is useful for controlling fuel delivery utilizes turbine power available from the steady state fuel flow within the valve assembly. A turbine element, which is moved by the steady state fuel flow, provides a motive force to a valve element that controls fuel delivery through selected outlet members of the valve arrangement. A rotating cage valve member preferably is coupled with the turbine element so that the valve member rotates responsive to movement of the turbine element. A controller determines the rate of rotation of the valve member and selectively controls a braking actuator to control the movement of the turbine element and the valve member.

17 Claims, 4 Drawing Sheets

VALVE ASSEMBLY FOR USE IN A GAS FUEL NOZZLE

BACKGROUND OF THE INVENTION

This invention generally relates to a valve assembly for active combustion control and more particularly to a valve assembly for use in a gas turbine device.

Gas turbine engines are well known. One challenge constantly faced in using such machinery is to control the fuel flow rate so that appropriate fuel delivery levels are achieved. There is a need for valve assemblies to meter the fuel flow to achieve the fuel modulation frequency and phase commanded by the control signal input.

A variety of valve arrangements have been proposed, including linear actuators that move responsive to control signals to open or close fuel flow passages to appropriately meter fuel flow. While linear actuators, such as solenoids, are capable of moving at necessary speeds to achieve desired frequencies, they are not without limitations. One difficulty experienced with linear actuators is that the devices tend to require repair or replacement after a large number of repeated cycles.

Other proposed arrangements have included rotary valves with electric motors providing a motive force to rotate the valve components as needed to control fuel flow. A difficulty associated with such arrangements is the inherent inertia and other control factors associated with utilizing an electric motor. Moreover, having to supply electric power to locations within the fuel flow stream introduces the need to adequately seal off the electrical driver components from the combustible fuel. Such seal arrangements are difficult to achieve and introduce further complexities into the system.

There is a need for an improved valve assembly that has the capability of a linear actuator arrangement with the longevity aspects of prior suggested rotary valves but does not introduce the safety or complexity concerns of prior arrangements. This invention provides such a valve arrangement and avoids the shortcomings and drawbacks of prior attempts.

SUMMARY OF THE INVENTION

In general terms, this invention is a valve assembly for controlling fuel flow in a gas turbine engine arrangement.

A valve assembly designed according to this invention includes a valve housing. A main fuel flow pathway extends through at least a portion of the valve housing and terminates in a plurality of outlet members that permit the fuel to exit the main passageway. An actuated fuel passageway preferably extends through a portion of the valve housing. The actuated fuel passageway includes a second plurality of outlet members that permit fuel to exit the actuated fuel passageway. A valve member is supported within the actuated fuel passageway to control the amount of fuel delivered through the second plurality of outlet members. A turbine element preferably is supported within the housing so that the turbine element moves responsive to fuel flow through the housing. The turbine element preferably is associated with the valve member in the actuated fuel pathway so that movement of the turbine element causes movement of the valve member, which results in the desired fuel flow control.

In one example, an electronic controller controls the rate of movement of the turbine element. The turbine element is normally moved at a high rate based upon the existing fuel flow through the housing. The controller preferably controls an electronic brake arrangement that selectively slows down the rate of movement of the turbine element to thereby control the movement of the valve member and the eventual fuel flow from the second plurality of outlet members associated with the actuated fuel pathway.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
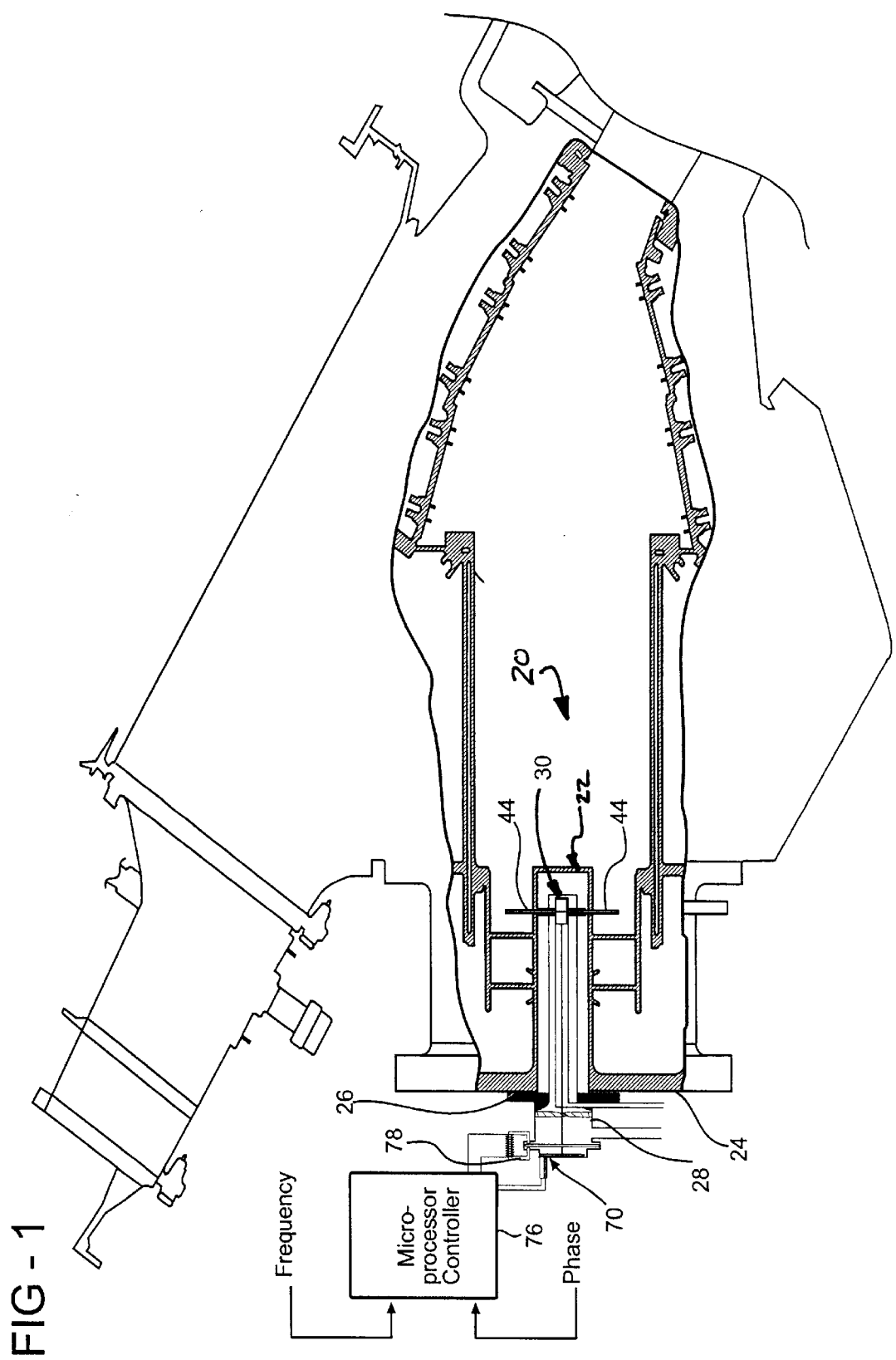
FIG. 1 schematically illustrates a fuel nozzle assembly incorporating an example valve designed according to this invention.
Figure 2:
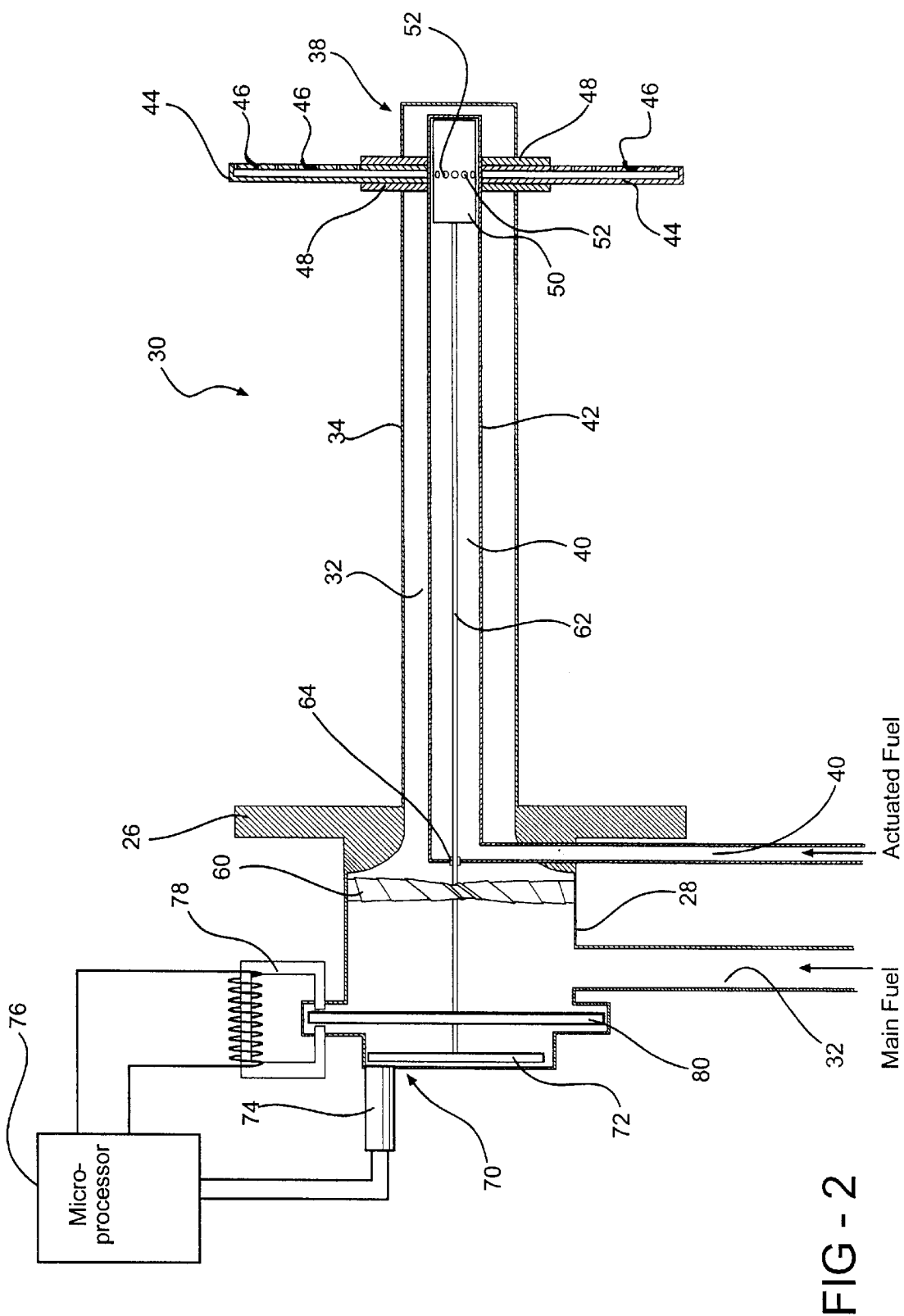
FIG. 2 schematically illustrates in somewhat more detail, the example valve assembly of the embodiment of FIG. 1.
Figure 3:
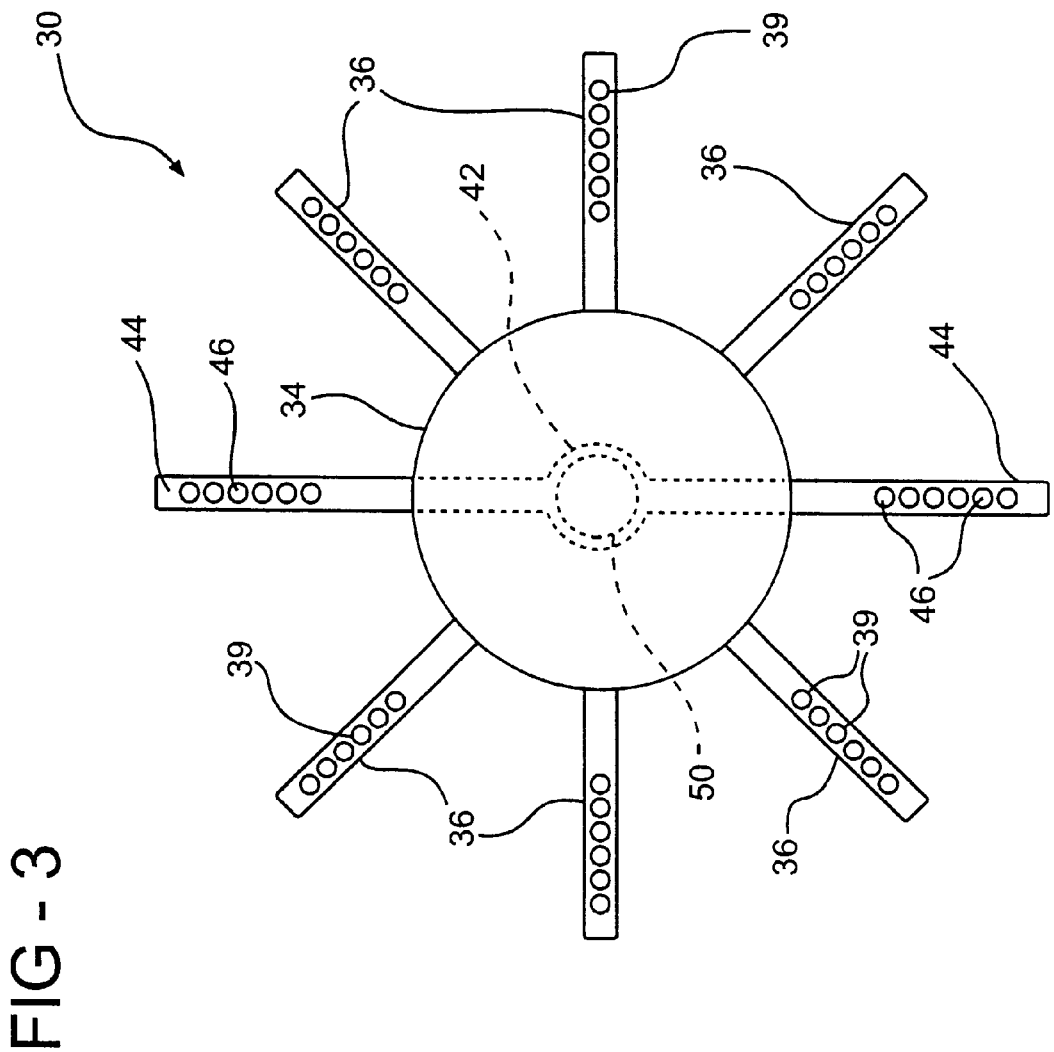
FIG. 3 is an end view of one end of the valve assembly example of FIG. 2.

A fuel nozzle assembly 20 is schematically shown having a nozzle center body. 22 defining an annular flow passage. In one example, the engine air flows through the nozzle assembly at approximately 300 PSI. As known, the center body 22 is attached to an outer can through several vanes that induce swirl. The center body also includes a number of radial spokes downstream through which gaseous fuels is injected into the airflow. The illustrated nozzle is similar to known industrial gas turbine premixing nozzles and its operation relative to a combustor is known. The inventive assembly includes a unique valve assembly.

A valve supporting portion 24 of the nozzle assembly 20 cooperates with a mounting flange 26 that is associated with a valve housing 28 such that a valve assembly 30 is supported at least partially within the nozzle assembly. The mounting flange 26 is secured to the valve supporting portion 24 of the nozzle assembly using any of several known mounting techniques.

The valve assembly 30 includes a main fuel flow pathway 32 extending through at least a portion of the valve housing 28. An outer plenum 34 has a generally cylindrical outer body wall that encloses a portion of the main fuel flow pathway 32. A plurality of outlet members 36 are positioned near one end 38 of the valve assembly 30 at a terminal end of the main fuel flow pathway 32. In the illustrated example, the outlet members 36 are radially extending spokes having a plurality of openings 39 through which the fuel from the main fuel flow pathway 32 exits the valve assembly 30 and enters into the air stream within the center body 22 of the nozzle assembly.

The valve assembly 30 also includes an actuated fuel flow pathway 40. An inner plenum 42 includes a generally cylindrical wall positioned coaxial with the outer plenum 34. The actuated fuel flow pathway 40 terminates in a second plurality of outlet members 44. In the illustrated example, the outlet members 44 are radially extending spokes having a plurality of openings 46 through which the fuel exits the pathway 40.

The outlet members 44 include extensions 48 that extend through the main fuel flow pathway 32 (i.e., between the outer plenum 34 exterior wall and the exterior wall of the inner plenum 42). The extensions 48 help to isolate the main fuel flow from the actuated fuel flow.

In the illustrated example, six main fuel outlet member spokes 36 and two actuated fuel outlet member spokes 44 are shown. Any number of outlet members, whether they are spokes or take another form, may be used within the scope of this invention. Those skilled in the art who have the benefit of this description will be able to determine the appropriate number, size and configuration of the outlet members to achieve the desired fuel flow for a given situation.

A valve member 50 is supported within the actuated fuel flow pathway 40 to control the amount of fuel that exits the outlet members 44. The valve member 50 in the illustrated example is a generally cylindrical valve member having a plurality of openings 52 through which fuel is permitted to flow. The openings 52 preferably are axially aligned with the outlet members 44 at the junction between the outlet members and the inner plenum 42. Accordingly, whenever an opening 52 is aligned with the passage into an outlet member 44, fuel is permitted to flow from the actuated fuel pathway 40 out through the openings 46 of the outlet members 44.

The valve member 50 in the illustrated example rotates so that as the openings 52 move relative to the inner plenum 42, fuel is delivered through the outlet members 44 in a controlled manner.

A significant advantage of this invention is that the valve member 50 can be positioned within the valve assembly 30 immediately adjacent the fuel delivery point. Because the openings 52 of the valve member 50 are directly aligned with the outlet members 44, there is no concern with the dynamics of fuel flow through another portion of the valve assembly prior to delivery through the outlet members 44. This provides a more accurately controlled fuel flow.

The size and spacing of the openings 52 on the valve member 50 is a function of the desired flow rate and the required turbine speed. Once those two factors are determined, the diameter of the holes can be developed to accommodate the needs of a particular situation. Those skilled in the art who have the benefit of this description will be able to determine how to appropriately size and position the holes 52 to achieve the results needed for their particular situation.

Another advantage of the inventive valve arrangement is that there is no load associated with a pressure drop across the openings 52 and, as a result, wear is minimized and a minimal torque is required to overcome the load associated with the minimal pressure drop.

The dimensions of the valve member 50 and the inner wall on the inner plenum 42 preferably are chosen to minimize fuel leakage from the actuated fuel pathway. Some leakage is acceptable and those skilled in the art who have the benefit of this description will be able to develop appropriate tolerances to control fuel leakage to an acceptable level of the total flow.

The valve member 50 preferably is propelled by a moving turbine member 60. In the illustrated example, the turbine member 60 is supported within the valve housing 28 so that the flow of the main fuel through the main fuel pathway 32 causes rotation of the turbine member 60. Therefore, the turbine member 60, which provides a motive force to the valve member 50, does not require any external motor or other source of a motive force. A significant advantage of this invention is that a valve assembly designed according to this invention utilizes the fuel flow already present within the system to provide a motive force to move a valve member, which in turn controls fuel delivery.

Although the illustrated example includes a rotary turbine member 60, other turbine arrangements are within the scope of this invention.

The valve member 50 preferably is coupled to the turbine member 60 through a shaft schematically illustrated at 62 so that the valve member 50 and the turbine member 60 rotate in unison. In the illustrated example, a seal member 64 is provided at the portion of the actuated fuel pathway 40 where the shaft 62 penetrates the inner plenum body 42. A variety of seals that accommodate a rotating member within the center of the seal can be used and those skilled in the art who have the benefit of this description will be able to choose from among commercially available components to achieve the desired degree of sealing.

Another shaft portion 66 extends in an opposite direction away from the turbine member 60. The shaft portion 62 and 66 preferably rotate in unison as the turbine member 60 rotates. In one example, a single shaft extends through either side of the turbine element 60.

A rotation rate sensor assembly 70 provides an indication of the rotation rate and position of the valve member 50 relative to the outlet members 44. The illustrated example includes a disk 72 that is supported within the valve housing 28 within the main fuel flow pathway 32. The disk 72 preferably includes a plurality of segments circumferentially spaced around the disk 72. A sensor device 74 detects movement of the segments as the disk 72 rotates with the shaft 66 and the turbine member 60. In one example, a Hall Effect sensor arrangement is used where the segments on the disk 72 are magnetic and the sensor device 74 detects movement of the magnetic segments as they move past the sensor 74.

A controller 76 preferably gathers information from the sensor arrangement 70 and determines the rate of rotation of the valve member 50. The rotation rate of the valve member 50 provides an indication of the fuel flow through the outlet members 44. The controller 76 preferably is programmed to control the frequency and phase of fuel delivery through the outlet members 44. As known in the art, frequency control is desired to counteract instability within the combustor.

The frequency of fuel modulation as delivered by the valve member 50 is determined in one example by multiplying the rate of rotation at which the valve member 50 spins multiplied by the number of openings 52 on the valve member. The indications provided by the disk 72 preferably are timed to coincide with positions of the openings 52 relative to the outlet members 44. As the controller 76 determines the relative positions of the openings 52 and the outlet members 44, the phase of fuel delivery can be controlled to coincide with a specific point in the oscillations within the system.

A known dynamic pressure transducer, for example, provides information to the controller 76 regarding the fuel oscillation, which provides an indication of the needed phase of fuel distribution. Given this description, those skilled in the art will be able to suitably program a controller 76 to achieve needed delivery, which may be, for example, a commercially available microprocessor.

The controller 76 preferably controls the rate of rotation of the valve member 50 by selectively slowing down the rate of movement of the turbine member 60 as caused by the main fuel flow within the fuel flow pathway 32. The illustrated example includes an electrically powered brake actuator 76 and a braking element 80, which is a disk. The disk 80 preferably is supported to rotate with the shaft 66 so that it is fixed to rotate with the turbine element 60. By appropriately energizing the braking actuator 78, the movement of the disk 80 is selectively controlled, which controls the rate of movement of the turbine member 60. The fuel flow through the main fuel flow pathway 32 normally causes the turbine element 60 to rotate at a relatively high rate. By applying a braking force, the turbine element 60 can be slowed down and maintained at a controlled rate of movement. In this manner, the rate of rotation of the valve member 50 is selectively controlled. In one example, the brake actuator 78 utilizes known eddy current techniques to slow down movement of the disk 80. Because the disk 80 is supported within the fuel flow pathway, movement of the fuel past the disk provides a cooling effect to the disk, which otherwise experiences heat buildup because of the braking force caused by the brake actuator 78.

The inventive valve assembly includes the turbine drive that utilizes the available excess pressure drop that is otherwise dissipated through a valve. Additionally, the use of a turbine drive to absorb the available power reduces the overall moment of inertia of the rotating valve component 50 to improve the valve response compared to situations where an electric motor is utilized to move a rotary valve member. Further, the turbine arrangement of the inventive valve assembly removes electrical power requirements from the fuel-filled region of the valve.

Figure 4:
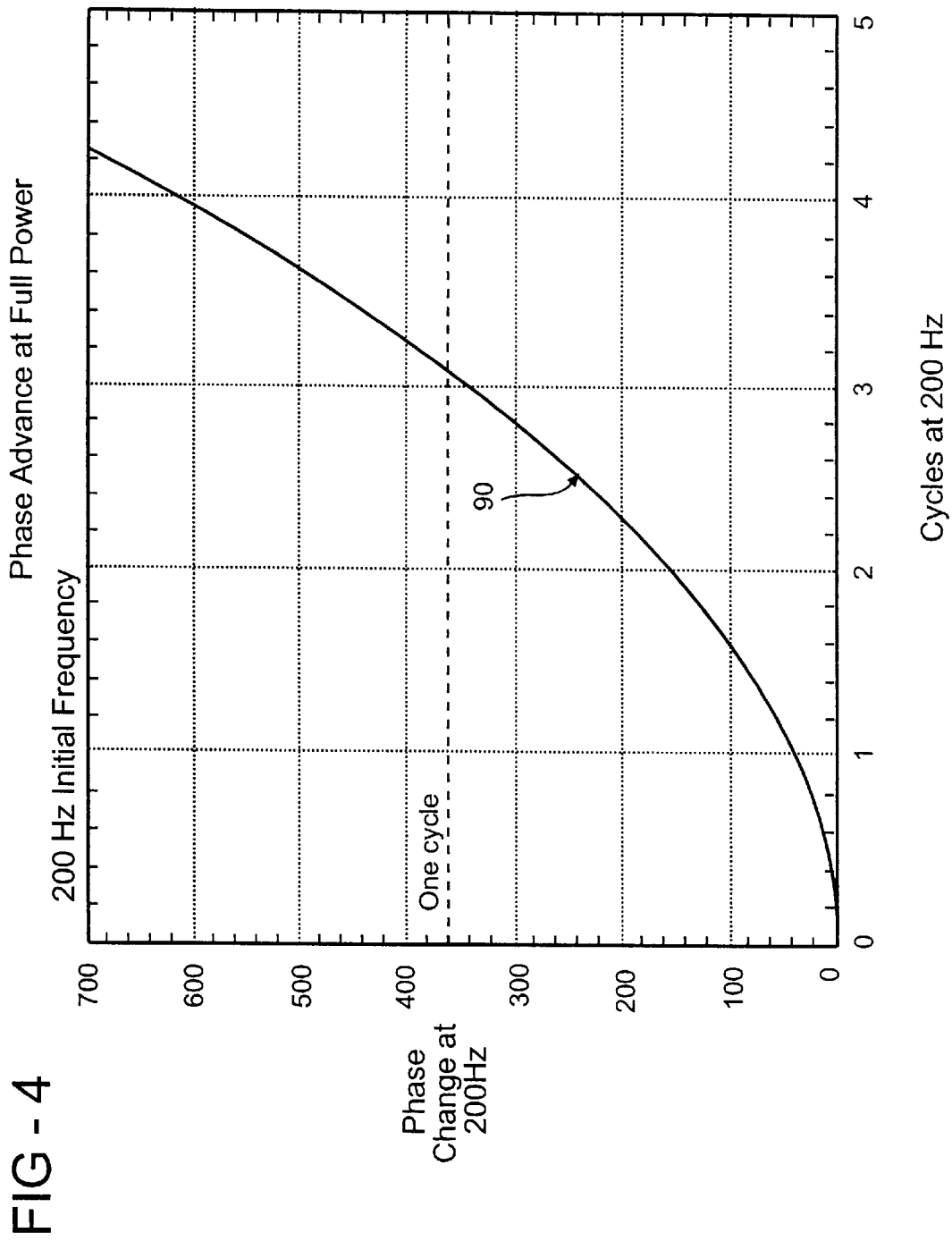
FIG. 4 graphically illustrates a performance feature of an example valve assembly designed according to this invention.

The power available to move the valve member 50 is a function of the steady state fuel flow rate and available pressure drop. In one example, a 10% pressure drop, which is a conservative estimate, provides approximately three horsepower. In an example where a 50% turbine efficiency is assumed, the acceleration of the system is shown within the plot 90 of FIG. 4. In this example, the valve member 50 can advance 360° in phase within three complete valve cycles providing a level of response that is useful to control fuel modulation in response to engine pressure fluctuations.

The inventive valve assembly arrangement provides high response and long term operation. Utilizing a pressure-balanced cage valve member 50 effectively eliminates loading associated with the pressure drop, and improves response and increases the reliability of the valve to provide required modulation levels while minimizing frictional losses. The inventive arrangement takes advantage of the combined low rotational inertia and the readily available power to accelerate and decelerate the valve member 50.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel control assembly for use in a gas turbine engine, comprising:
   a valve housing;
   a main fuel flow path through at least a portion of the housing, the main fuel flow path terminating in a plurality of outlet members that permit fuel to exit the main fuel flow path;
   an actuated fuel path through at least a portion of the housing, the actuated fuel path terminating in a second plurality of outlet members that permit fuel to exit the actuated fuel path;
   a turbine element supported by the valve housing such that the turbine element moves responsive to fuel flowing through at least a portion of the valve housing; and
   a valve member supported in the actuated fuel path to move with the turbine element, the valve member having a plurality of openings that move into communication with the second plurality of outlet members as the valve member moves relative to the housing to control an amount of fuel exiting the second plurality of outlet members.

2. The assembly of claim 1, wherein the valve member comprises a cylinder having an outer wall with the plurality of openings through the outer wall, each of the openings being at the same axial distance from one end of the cylinder, the valve member rotating with movement of the turbine element.

3. The assembly of claim 1, including a shaft coupling the valve member to the turbine element such that rotation of the turbine element responsive to fuel flow causes rotation of the valve member.

4. The assembly of claim 1, wherein the valve member rotates responsive to the turbine element movement and including a controller that determines a rate of rotation of the valve member and controls the rate to thereby control the fuel flow through the second plurality of openings.

5. The assembly of claim 4, including an encoder associated with the valve member that provides an indication of the rate of rotation of the valve member to the controller.

6. The assembly of claim 4, including a brake associated with the turbine element and the valve member, the brake being responsive to commands from the controller to control the rate of rotation.

7. The assembly of claim 1, wherein the plurality of outlet members and the second plurality of outlet members are near one end of the housing and wherein the valve member is near the one end of the housing.

8. The assembly of claim 1, wherein the turbine element is positioned within the main fuel flow path.

9. The assembly of claim 1, wherein the main fuel flow path includes a first cylindrical portion and the actuated fuel flow path includes a second cylindrical portion that is coaxial with and positioned within the first cylindrical portion, and wherein the second plurality of outlet members each have an extension portion extending from the second cylindrical portion through the interior of the first cylindrical portion, the extension portions isolating fuel from the actuated fuel flow path from the main fuel flow path.

10. A fuel control assembly for use in a gas turbine engine, comprising:
    a nozzle adapted to deliver fuel to a combustor;
    a valve housing supported by the nozzle such that at least a portion of the valve housing extends into an interior of the nozzle;
    a main fuel flow path through at least a portion of the valve housing, the main fuel flow path terminating in a plurality of outlet members positioned within the nozzle to permit fuel to enter the interior of the nozzle from the main fuel flow path;
    an actuated fuel path through at least a portion of the housing, the actuated fuel path terminating in a second plurality of outlet members positioned within the nozzle to permit fuel to enter the interior of the nozzle from the actuated fuel path;
    a turbine element supported by the valve housing such that the turbine element rotates responsive to fuel flowing through at least a portion of the valve housing; and
    a valve member supported in the actuated fuel path to rotate with the turbine element, the valve member having a plurality of openings that move into communication with the second plurality of outlet members as the valve member rotates relative to the housing to control an amount of fuel exiting the second plurality of outlet members.

11. The assembly of claim 10, wherein the valve member comprises a cylinder having an outer wall with the plurality of openings through the outer wall, each of the openings being at the same axial distance from one end of the cylinder.

12. The assembly of claim 10, wherein the plurality of outlet members and the second plurality of outlet members are near one end of the housing and wherein the valve member is near the one end of the housing.

13. The assembly of claim 10, including a shaft coupling the valve member to the turbine element such that rotation of the turbine element responsive to fuel flow cause rotation of the valve member.

14. The assembly of claim 10, including a controller that determines a rate of rotation of the valve member and controls the rate to thereby control the fuel flow through the second plurality of openings.

15. The assembly of claim 14, including an encoder associated with the valve member that provides an indication of the rate of rotation of the valve member to the controller.

16. The assembly of claim 14, including a brake associated with the turbine element and the valve member, the brake being responsive to commands from the controller to control the rate of rotation.

17. The assembly of claim 16, wherein the brake is electrically activated.

* * * * *